United States Patent [19]

Langerak et al.

[11] Patent Number: 5,100,549

[45] Date of Patent: Mar. 31, 1992

[54] TUBULAR MEMBRANE MODULE

[75] Inventors: Robert W. Langerak; Paul B. Koehler, both of Burlington, Canada

[73] Assignee: Zenon Environmental Inc., Burlington, Canada

[21] Appl. No.: 498,656

[22] Filed: Mar. 26, 1990

[51] Int. Cl.⁵ .................... B01D 63/02; B01D 63/04
[52] U.S. Cl. ..................... 210/321.8; 210/321.89; 210/500.23
[58] Field of Search ............ 218/321.78, 321.79, 218/321.8, 321.87, 321.88, 321.89, 336, 321.81, 321.9, 500.23

[56] References Cited

U.S. PATENT DOCUMENTS

| | | |
|---|---|---|
| 2,353,489 | 7/1944 | Newcomb . |
| 3,722,694 | 3/1973 | Agranat . |
| 3,834,545 | 7/1974 | Del Pico et al. . |
| 4,309,287 | 1/1982 | Roos et al. . |
| 4,334,993 | 6/1982 | Norton . |
| 4,400,019 | 8/1983 | Fruck . |
| 4,707,261 | 11/1987 | Ikeyama et al. . |
| 4,747,946 | 5/1988 | Ikeyama et al. . |
| 4,846,973 | 7/1989 | Barnard .................. 210/336 |
| 4,897,191 | 1/1990 | Langerak et al. ............. 210/321.81 |

Primary Examiner—Frank Sever
Attorney, Agent, or Firm—Alfred D. Lobo

[57] ABSTRACT

A tubular membrane module for example for use in ultrafiltration has a tubular shell made of standard PVC pipe and moulded PVC end fittings. A series of membrane tubes within the shell extend between coupling members at both ends. The coupling members fit closely inside the shell and end fittings and are secured in place using epoxy adhesive. A transverse wall in each coupling member is provided with sockets which receive the ends of the tubes and in which the tubes are secured by a similar adhesive. Each socket has a blind end that receives the end portion of the tube so that the tube is protected from shear effects due to fluid entering the tube under pressure in use.

7 Claims, 2 Drawing Sheets

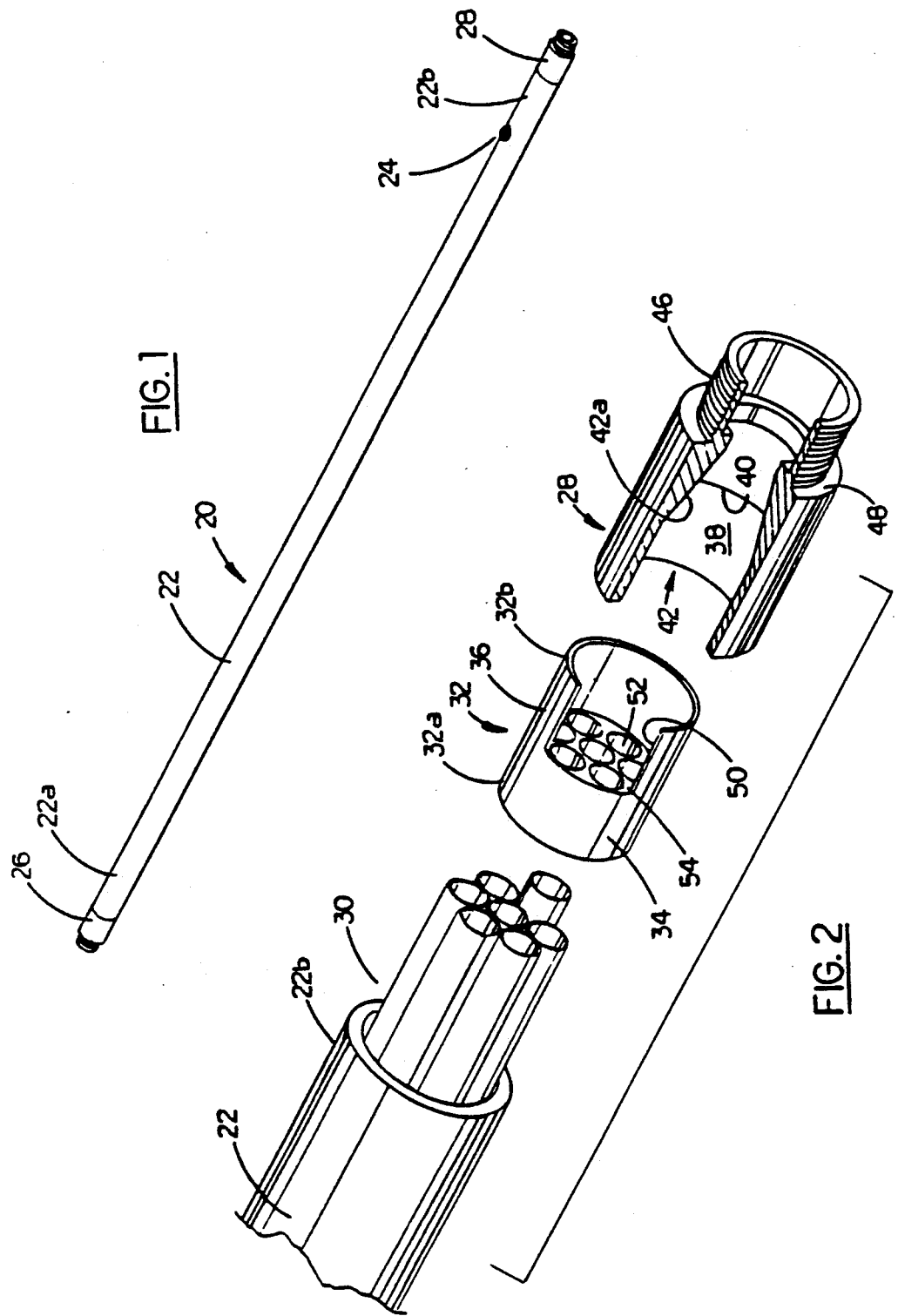

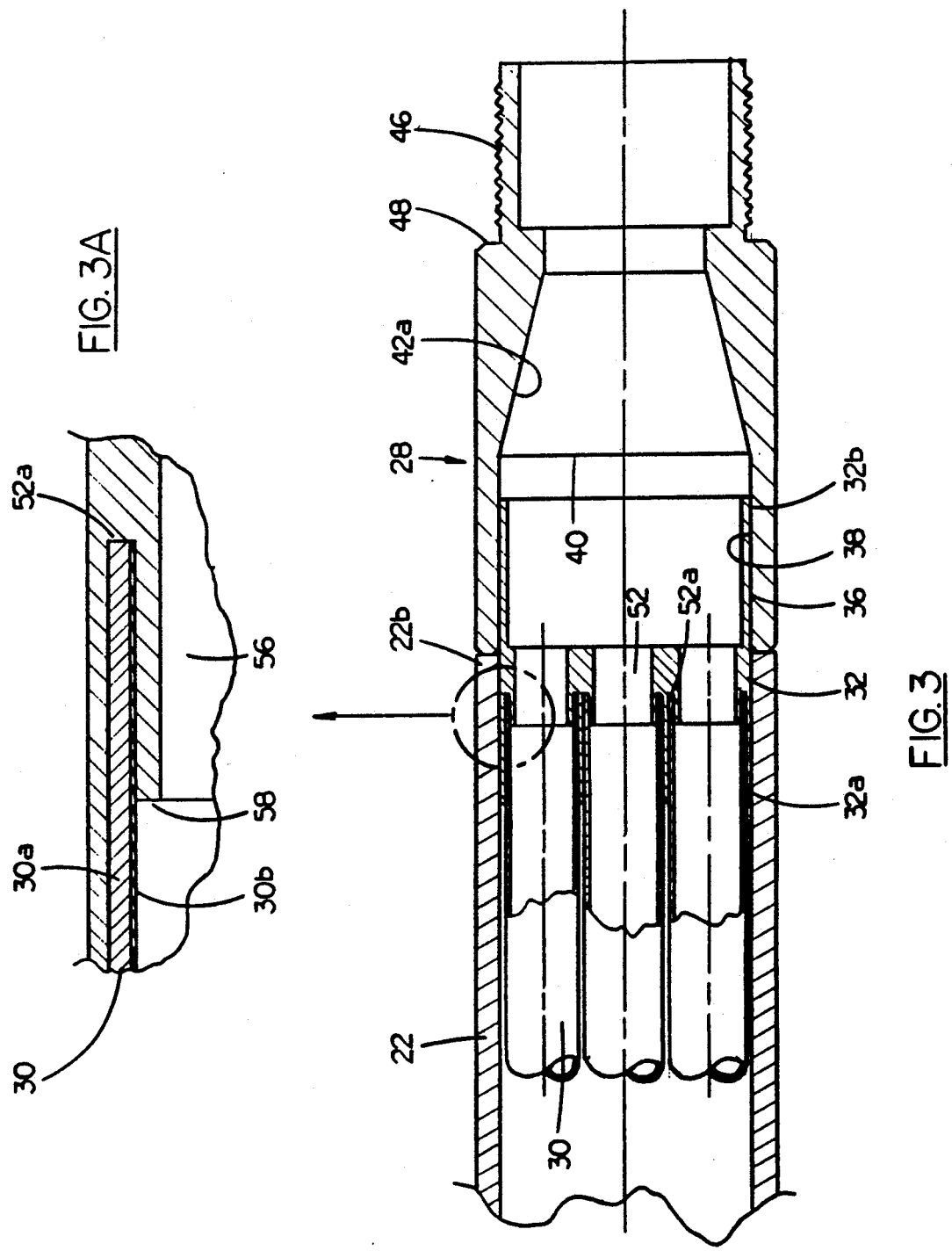

TUBULAR MEMBRANE MODULE

FIELD OF THE INVENTION

This invention relates to tubular membrane modules used in pressure-driven fluid concentration and/or separation processes. Examples of such processes are microfiltration, ultrafiltration and reverse osmosis.

BACKGROUND OF THE INVENTION

The term "tubular membrane module" is used to refer to a component which includes at least one tube comprising a semi-permeable membrane of tubular configuration supported on the inner surface of a porous pipe such as a glass fibre-reinforced fabric pipe. The tube is enclosed within an outer housing or "shell" having a permeate outlet. Fluid to be treated is passed through the tube under pressure. Permeate passes through the membrane and pipe into the interior of the housing and leaves through the permeate outlet. In some cases, a single tube is used, while in others the module may include a series of tubes arranged axially parallel to one another. A complete ultrafiltration apparatus, for example, will typically include at least one array of modules connected together so that fluid to be treated flows successively therethrough. The modules are usually replaceable individually.

DESCRIPTION OF THE PRIOR ART

It will be understood that a module must be designed so that there is a pressure-tight seal between the individual membrane tube or tubes and the interior of the outer housing or shell of the module. One approach is to embed or "pot" end portions of the membrane tube or tubes in a mass of synthetic resin material that in effect plugs the ends of the housing. This approach is exemplified by the teachings of U.S. Pat. Nos. 4,707,261 and 4,747,946 (Ikeyama et al.). These patents both disclose a tubular membrane ultrafiltration module in which a plurality of water permeable non-woven fabric pipes are formed on the inside surface of an outer cylinder. The pipes are inserted into the outer cylinder in a closely bundled state and the spaces between the pipes and the outer cylinder at each end are filled with a synthetic resin material. When the resin cures, the result is a monolithic structure of non-woven fabric pipes set in an outer cylinder by means of the hardened synthetic resin.

A difficulty with this approach is that the synthetic resin material tends to flow under gravity during the curing process. As a result, the respective ends of the module must be "potted" separately and the resin in one end must be allowed to set before the other end of the module is potted. A special jig is usually used to support the module while the resin sets. Another problem is that this method does not protect the membrane face from the effect of fluid "shear" that would otherwise tend to strip the membrane from its supporting pipe.

Other examples of this design concept are shown in U.S. Pat. No. 3,722,694 (Agranat) and in U.S. Pat. No. 4,334,993 (Norton).

Another approach to the problem of sealing the ends of the membrane tube or tubes is to provide each end of each tube with a rubber "boot" type of seal, for example as disclosed in U.S. Pat. No. 3,834,545 (Del Pico et al.). In this design, the end portions of the membrane tubes are each embraced by a rubber boot having an inner wall that extends over the membrane at the interior the tube and an outer wall that lies on the exterior of the tube. The end portion of the tube, covered by the boot, is received in a complimentary opening in a header and the boot has external ridges that seal against the interior surface of the header. A metal clip is usually provided inside the tube to urge the boot against the tube.

Boot seal failures are quite common with this design. The life of the seal is often adversely affected by abrasion due to relative movement between the membrane tube and the housing as a result of temperature changes in service.

The following patents were also considered in the preparation of the above-identified application:
U.S. Pat. Nos:
2,353,489 (Newcomb)
4,309,287 (Roos et al.)
4,400,019 (Fruck)

SUMMARY OF THE INVENTION

An object of the present invention is to provide a multiple tube membrane module which avoids the sealing problems of the prior art.

The module provided by the invention includes a tubular shell having first and second ends and a permeate outlet adjacent one of said ends. First and second end fittings are provided at the respective ends of the shell. The fittings have respective fluid passageways therethrough and are adapted to permit coupling of the module to external fluid inlet and outlet means for flow of the fluid through the module. A plurality of membrane tubes extend longitudinally of and within the shell and each comprise a porous pipe having a permeable membrane on an inner surface thereof. First and second coupling members are provided at respectively opposite ends of the membrane tubes and couple the end fitments with the tubes and shell. Each coupling member has an inner end portion with a tubular external surface which is dimensioned to fit within and make surface-to-surface contact with an end portion of the shell and the surfaces are sealed together. Each member also has an outer end portion with a tubular surface dimensioned to make surface-to-surface contact with a corresponding tubular surface portion of the end fitting. Those surfaces are also sealed together. A plurality of sockets are provided in a transverse wall between the inner and outer end portions of the coupling member and each socket closely receives an end portion of one of the membrane tubes with the tube end portion adhesively secured within the socket. The sockets provide communication between the interiors of the tubes and the exterior of the module through the fluid passageway of the relevant fitting.

Sealing of the coupling members to the end fittings and shell and securing of the membrane tubes can be achieved using an epoxy resin or a poly-urethane adhesive, provided the components of the module are made of one or more plastics materials that can be bonded together by this type of adhesive. For example, the tubular shell may be a section of standard PVC (polyvinylchloride) pipe and the end fittings and coupling members may be moulded in PVC. In this embodiment, the assembled module is essentially a monolithic structure having a high resistance to fluid leakage. In other words, the module exhibits the advantages of the prior art designs that utilize potting of the membrane tubes in an epoxy resin material, but without the difficulties of manufacture presented by the prior art designs.

BRIEF DESCRIPTION OF THE DRAWINGS

In order that the invention may be more clearly understood, reference will now be made to the accompanying drawings which illustrate a particular preferred embodiment of the invention by way of example, and in which:

FIG. 1 is a perspective view of a tubular membrane module in accordance with a preferred embodiment of the invention;

FIG. 2 is an exploded perspective view of one end portion of the module shown in FIG. 1, the other end portion being identical;

FIG. 3 is a longitudinal sectional view corresponding to FIG. 2 but showing the components of the module assembled; and, FIG. 3a is an enlarged detail view of the part of FIG. 3 that is indicated at A.

DESCRIPTION OF THE PREFERRED EMBODIMENT

The drawings show a tubular membrane module that was developed primarily for use in an ultrafiltration apparatus, for example for separating oil from water. The apparatus itself has not been shown since it is not part of the present invention, and may be conventional. In FIG. 1, the module is denoted generally by reference numeral 20. By way of illustration, the module may have an overall length of approximately 10 feet and a nominal external diameter corresponding to the diameter of standard PVC pipe of 1.5 inch nominal internal diameter. An ultrafiltration unit will normally include at least one array or bank of similar modules coupled together for series flow of fluid through at least several of the modules.

Module 20 includes a tubular shell 22 which has first and second ends 22a and 22b respectively and a permeate outlet 24 adjacent end 22b. The shell is made of a standard length of nominal 1.5 inch ID PVC pipe as indicated previously. Respective end fittings 26 and 28 are provided at opposite ends of the shell and are designed to permit the module to be coupled to external components for permitting fluid flow through the module. As shown in the drawing, fitting 26 is at the inlet end of the module and fitting 28 at the outlet end. Fluid to be filtered will enter the module under pressure through fitting 26 and the filtered fluid will leave through fitting 28 while permeate will leave through outlet 24. In the illustrated embodiment, outlet 24 is a threaded hole in the wall of shell 22 into which a suitable outlet fitting (not shown) can be secured by adhesive.

Referring now to FIGS. 2 and 3, a plurality of membrane tubes 30 extend longitudinally of and within shell 22. FIGS. 2 and 3 show only one end of the module but may be taken as representative of both ends. FIG. 2 shows an end portion of shell 22 with portions of the membrane tubes 30 protruding therefrom, end fitting 28 and a coupling member 32 for coupling fitting 28 with the tubes 30 and with shell 22, as will be described. A similar coupling member is of course provided at the other end of the module in association with end fitting 26 but has not been shown.

Each membrane tube 30 comprises a porous pipe 30a having a permeable membrane 30b on its inner surface (see FIG. 3a). In this particular embodiment, the pipe is a polyester straw made from spirally wound polyester tape impregnated with "dots" of polyethylene, polypropylene or other plastic material which are thermally activated to bond together the wound tape and form a rigid pipe. A polypropylene straw may be used as an alternative. The semi-permeable membrane is cast onto the side surface of the pipe as it is made. The structure of the membrane tube and its method of manufacture have not been specifically illustrated in the drawings since they will be familiar to a person skilled in the art. Also, other types of pipe may be used within the broad scope of the invention, for example a porous FRP (fibre-reinforced plastic) pipe with a suitable liner at the inner surface.

In the particular embodiment illustrated, seven membrane tubes are used. Coupling member 32 is provided with seven corresponding sockets in which the membrane tubes are received and sealed as will be described later with reference to FIGS. 3 and 3a. The member itself is also sealed to shell 22 and fitting 28. More particularly, member 32 has inner and outer end portions 32a and 32b respectively which, in the illustrated embodiment, are formed by a common cylindrical wall of the member. As such, the inner end portion 32a has a cylindrical external surface 34 while the outer end portion 32b has a similar surface 36. Member portion 32a is dimensioned to fit closely within the adjacent end portion of shell 22 so that surface-to-surface contact is established between the external surface 34 and the internal surface of the shell. The two surfaces are sealed together by an epoxy resin adhesive.

Both member 32 and fitting 28 are PVC injection mouldings. Member 32 is also secured to the fitting by an epoxy resin adhesive. More specifically, fitting 28 has an internal cylindrical surface 38 at its inner end that is dimensioned to receive the outer end portion 32b of member 32, again in close surface-to-surface contact. An internal shoulder 40 at the inner end of surface 38 defines the fully inserted position of member 32. Surface 38 defines part of an internal passageway 42 through the fitting that includes a tapered portion 42a. An outer end portion 44 of the fitting that is externally screw-threaded at 46 to permit coupling of the module to external fluid inlet or outlet means. A shoulder 48 at the inner end of the screw-threaded portion 44 provides a surface for mounting the module in an ultrafiltration apparatus.

In FIG. 2, part of the external wall of the coupling member is shown broken away at 50 to reveal the sockets 52 for receiving the membrane tubes 30. The sockets are formed in a transverse wall 54 of the coupling member.

FIG. 3 shows the cross-sectional shapes of the sockets 52 in detail. Each socket is shaped to provide a blind end portion 52a that is accessible from the inner end portion 32a of the member (the end at the left-hand side in FIGS. 2 and 3). Each of these blind end socket portions is dimensioned to closely receive the relevant end portion of one of the membrane tubes 30. The tube end portion is secured by epoxy resin adhesive within the socket end portion 52a with its end face fully seated against the blind end of the socket. A port 56 of smaller diameter than and within the blind end portion 52a provides communication between the interior of each membrane tube 30 and the passageway 42 through the fitting. As best seen in the enlargement of FIG. 3a, the blind end of the socket in effect forms an undercut with respect to port 56 leaving a shoulder 58 between the port and the tube 30. Shoulder 58 protects the tube from the effects of fluid shear caused by fluid entering the tube 30 from port 56 under pressure. The fluid shear effect could otherwise cause the membrane to be stripped from the inner surface of the membrane tube.

Assembly of the module may be effected by first cutting shell 22 and the membrane tubes 30 to length (if necessary) and then assembling the tubes to each of the coupling members (one at each end). This will be done by simply fitting each of the seven tubes in turn to one of the coupling members after coating at least one of the surfaces to be joined, with adhesive. A second coupling member will then be assembled to the opposite end portions of the tubes and each end fitting finally secured in place. There will be no need to take special precautions to support the components during curing or to allow lengthy curing periods as is necessary with some of the prior art designs. Once the adhesive has set, the resulting structure will be monolithic in nature and will have a high resistance to fluid leakage either around the membrane tubes and into the space between the tubes and shell or from the shell itself.

It should be noted that the preceding description relates to a particular preferred embodiment of the invention only and that modifications are possible within the broad scope of the invention. For example, the internal surface of shell 22 may be grooved to provide additional clearance for flow of permeate to outlet 24 after it has passed through the membrane tubes 30.

If necessary, adhesive sealing of the coupling member to the end fitting at one end of the module could be replaced by an O-ring seal that would allow for relative axial movement between the shell and end fitting to accommodate axial expansion and contraction of the shell with respect to membrane tubes 30 due to thermal effects. The coupling member could be fitted over an external surface on the relevant end fitting instead of internally within the fitting as shown.

For ease of manufacture, the shell will normally be of cylindrical shape and the end fittings will be correspondingly shaped and have cylindrical outer end portions. However, within the broad scope of the invention other tubular shapes could be used. The number of tubes may also vary.

It should finally be noted that the particular materials and dimensions referred to previously are given by way of example only and are not limitative of the scope of the invention. For example the module shell may be made of plastic materials other than PVC (e.g. CPVC, polyurethane or PVDF) or stainless steel.

I claim:

1. A tubular membrane module comprising,
   means for providing an alternative to potted and rubber boot end sealing, including
   a tubular shell having first and second ends and a permeate outlet adjacent one of said ends;
   first and second end fittings at each end of the shell, said fittings having respective fluid passageways therethrough and being adapted to permit coupling of the module to external fluid inlet and outlet means;
   a plurality of membrane tubes extending longitudinally within said shell, each tube comprising a porous pipe having a permeable membrane on an inner surface thereof; and,
   first and second coupling members at opposite ends of the membrane tubes, coupling said end fittings with said tubes and shell, each coupling member including:
   (1) an inner end portion having a tubular external surface snugly fitted within an end portion of said shell, said surfaces being in fluid-tight relationship;
   (2) an outer end portion having a tubular surface dimensioned to make surface-to-surface contact with a corresponding tubular surface portion of said end fitting, said surface being sealed together, and,
   (3) a transverse wall between said inner and outer end portions, said wall provided with a plurality of sockets, each closely receiving an end portion of one of said membrane tubes with said tube end portion adhesively secured within the socket, the sockets providing communication between the interiors of the tubes and the exterior of the module through the fluid passageway of the relevant end fitting.

2. A module as claimed in claim 1, wherein said end portions of the shell are of cylindrical shape and each said coupling member has a cylindrical outer surface providing said tubular surfaces of the coupling member end portions, and wherein said corresponding tubular surface portion of each end fitting is an internal cylindrical surface portion which receives the said outer end portion of the relevant coupling member.

3. A module as claimed in claim 1, wherein each said socket of the coupling member has a blind end closely receiving an end portion of one of said membrane tubes and in which the tube is adhesively secured, and a port of smaller diameter than and within said blind end providing communication between the interior of the tube and the relevant said end fitting fluid passageway.

4. A module as claimed in claim 2, wherein said internal cylindrical surface portion of each end fitting is provided at an inner end of said fluid passageway through the fitting, and wherein the passageway tapers inwardly from said internal cylindrical surface portion to an outer end portion of the fitting which is provided with an external screw thread for coupling to said external fluid inlet means or outlet means.

5. A module as claimed in claim 1, wherein said tubular shell is a standard length of plain cylindrical plastic pipe.

6. A module as claimed in claim 5, wherein said plastic pipe, end fittings and coupling members are made of PVC, and wherein the end fittings and pipe are secured together by epoxy resin adhesive.

7. A module as claimed in claim 6, wherein each said membrane tube comprises a porous polyester pipe having a permeable membrane cast on its inner surface.

* * * * *